US008731389B2

(12) United States Patent
Gainer

(10) Patent No.: US 8,731,389 B2
(45) Date of Patent: May 20, 2014

(54) AUTO-FOCUS MECHANISM FOR VISION SYSTEM CAMERA

(75) Inventor: Robert Gainer, Newberg, OR (US)

(73) Assignee: Cognex Corporation, Natick, MA (US)

(*) Notice: Subject to any disclaimer, the term of this patent is extended or adjusted under 35 U.S.C. 154(b) by 0 days.

(21) Appl. No.: 13/302,922

(22) Filed: Nov. 22, 2011

(65) Prior Publication Data

US 2013/0129335 A1 May 23, 2013

(51) Int. Cl.
*G03B 3/10* (2006.01)
*G03B 3/00* (2006.01)

(52) U.S. Cl.
USPC .......................... 396/133; 396/144

(58) Field of Classification Search
USPC ............. 396/79, 89, 133, 144, 199, 529; 348/373, 374; 359/822–826
See application file for complete search history.

(56) References Cited

U.S. PATENT DOCUMENTS

| | | | |
|---|---|---|---|
| 3,968,504 A | 7/1976 | Komine | |
| 4,230,403 A | 10/1980 | Hashimoto et al. | |
| 4,451,131 A | 5/1984 | Shimizu | |
| 4,607,279 A * | 8/1986 | Takanashi et al. | 348/260 |
| 4,712,900 A | 12/1987 | Hamano et al. | |
| 4,864,341 A | 9/1989 | Maekawa et al. | |
| 5,136,320 A | 8/1992 | Kobayashi et al. | |
| 5,245,172 A | 9/1993 | Esslinger et al. | |
| 5,291,232 A | 3/1994 | Kobayashi et al. | |
| 5,363,164 A | 11/1994 | Kobayashi et al. | |
| 5,461,443 A * | 10/1995 | Nakayama et al. | 396/89 |
| 5,644,441 A | 7/1997 | Hirasaki et al. | |
| 5,783,811 A | 7/1998 | Feng et al. | |
| 5,818,528 A | 10/1998 | Roth et al. | |
| 5,821,518 A | 10/1998 | Sussmeier et al. | |
| 6,172,709 B1 | 1/2001 | Yamano et al. | |
| 6,266,196 B1 | 7/2001 | Do et al. | |

(Continued)

FOREIGN PATENT DOCUMENTS

| | | |
|---|---|---|
| JP | 11142917 | 5/1999 |
| JP | 2001255574 | 9/2001 |

(Continued)

OTHER PUBLICATIONS

Nunnink, "U.S. Appl. No. 13/302,751, Vision System Camera With Mount for Multiple Lens Types", filed Nov. 22, 2011.

(Continued)

*Primary Examiner* — W B Perkey
*Assistant Examiner* — Minh Phan
(74) *Attorney, Agent, or Firm* — Loginov & Sicard

(57) ABSTRACT

This invention provides an electro-mechanical auto-focus function for a smaller-diameter lens type that nests, and is removably mounted, within the mounting space and thread arrangement of a larger-diameter lens base of a vision camera assembly housing. In an illustrative embodiment, the camera assembly includes a threaded base having a first diameter, which illustratively defines a C-mount base. A motor-driven gear-reduction drive assembly is mounted internally, and includes teeth that engage corresponding teeth on the outer diameter of a cylindrical focus gear, which has an internal lead screw. The focus gear is freely rotatable, and removably captured, within the threaded C-mount base in a nested, coaxial relationship. The internal lead screw of the focus gear threadingly engages the external threads of a coaxial lens holder. This converts the drive gear rotation into linear/axial lens holder motion. The lens holder includes anti-rotation stops, which allow its linear/axial movement but restrain any rotational motion.

16 Claims, 7 Drawing Sheets

(56) References Cited

U.S. PATENT DOCUMENTS

| | | |
|---|---|---|
| 6,339,680 B1 | 1/2002 | Mauvais |
| 6,556,355 B2 | 4/2003 | Tsutsumi |
| 6,781,630 B2 | 8/2004 | Nomura et al. |
| 6,967,794 B2 | 11/2005 | Luthardt et al. |
| 7,850,377 B2 | 12/2010 | Okamoto et al. |
| 7,853,137 B2 | 12/2010 | Yang |
| 7,900,839 B2 | 3/2011 | Kotlarsky et al. |
| 8,033,670 B2 * | 10/2011 | Costigan et al. ............ 359/507 |
| 8,224,175 B2 * | 7/2012 | Yang ............................ 396/175 |
| 2009/0190919 A1 * | 7/2009 | Kuo ............................. 396/529 |
| 2010/0265599 A1 * | 10/2010 | Lin et al. ..................... 359/823 |

FOREIGN PATENT DOCUMENTS

| | | |
|---|---|---|
| JP | 2006276420 | 10/2006 |
| JP | 2009092863 | 4/2009 |
| JP | 2010026120 | 2/2010 |

OTHER PUBLICATIONS

Nunnink, "U.S. Appl. No. 13/302,858, Camera System With Exchangeable Illumiantion Assembly", filed Nov. 22, 2011.

* cited by examiner

AUTO-FOCUS MECHANISM FOR VISION SYSTEM CAMERA

FIELD OF THE INVENTION

This invention relates to vision system cameras and more particularly to lens mounts and focusing mechanisms for vision system cameras.

BACKGROUND OF THE INVENTION

Vision systems that perform measurement, inspection, alignment of objects and/or decoding of symbology (e.g. bar codes) are used in a wide range of applications and industries. These systems are based around the use of an image sensor, which acquires images (typically grayscale or color, and in one, two or three dimensions) of the subject or object, and processes these acquired images using an on-board or remote, interconnected vision system processor. The processor generally includes both processing hardware and non-transitory computer-readable program instructions that perform one or more vision system processes to generate a desired output based upon the image's processed information. This image information is typically provided within an array of image pixels each having various colors and/or intensities. In the example of a symbology (barcode) reader, the user or automated process acquires an image of an object that is believed to contain one or more barcodes. The image is processed to identify barcode features, which are then decoded by a decoding process and/or processor obtain the inherent alphanumeric data represented by the code. In other types of vision systems, various vision system tools (e.g. edge detectors, calipers, blob analysis) are employed by the system processor to detect edges and other features that allow for recognition of object features, and the determination of desired information based upon these features—for example whether the object is defective or whether it is properly aligned.

It is increasingly desirable to provide vision systems and associated vision system components that can be used for a variety of purposes. In any vision system, a key component is the vision system camera assembly. The camera assembly includes a lens (optics) and an imager (or "sensor") that provides the array of image pixel information. The vision system processor, as described above, receives the pixel data from the imager/sensor and processes it to derive useful vision system information about the imaged scene and/or object. The vision system processor and related components (e.g. data memory, decoders, etc.) can be provided within the camera assembly's housing or enclosure, or some or all of these components can be mounted remotely (e.g. within a PC, or other remote, self-contained processing system), and linked by a wired or wireless interconnect. Likewise, the camera assembly can include an on-board ring illuminator surrounding the lens, and/or another illumination arrangement that provides light to the imaged scene.

To increase the versatility of a vision system camera it can be desirable to employ differing types of lenses with a single camera assembly housing. In this manner, the user can tailor the optics to the particular vision system task. For example, some tasks can benefit by the use of a larger lens, such as a cine or C-mount unit (1-inch/25.4 mm in nominal base diameter), while others can be accomplished best with a smaller M12 thread (12 min×0.5 mm thread) lens, also termed an "S-mount", or more basically, an "M12" lens. Others are best suited to a liquid lens, or a similar arrangement. By way of example, the choice of lens type (e.g. C-mount, M12, liquid lens, etc.) can be driven by such factors as lighting/illumination, field of view, focal distance, relative angle of the camera axis and imaged surface, and the fineness of details on the imaged surface. In addition, the cost of the lens and/or the available space for mounting the vision system can drive the choice of lens.

In cameras, it is often desirable to provide an automatic focus ("auto-focus") capability. By way of example, electromechanical autofocus assemblies for photo and video cameras with interchangeable lenses (on a single mounting base) are commonly available. In some conventional photo/video camera auto-focus designs, the focus actuator is integrated in the camera (for example, in most high-end Nikon cameras). While other manufacturers (for example Canon) have integrated the focus motor into the exchangeable lens.

There exist commercially available cameras that employ a built-in auto-focus mechanism and associated drive motor for use with C-mount lenses. Likewise, various cameras have employed an auto-focus mechanism in connection with an M12 lens. However, all these systems are lens-mount specific, in that they are designed to operate with a single type of lens mount. This limits the adaptability of the camera assembly in taking on various tasks, where the ability to select a different type of lens for a specific task can be desirable.

It is therefore desirable to provide a vision system camera assembly that is capable of providing an auto-focus function to a particular type of lens and also allow for the mounting of a plurality of lens types, such as M-12 and C-mount, within the same camera assembly, while avoiding the need of costly changes to the vision system's physical housing or package. This vision system should be able to employ multiple lens types with no reduction in quality of the acquired image when compared with using a system that provides a discrete lens mount for a single lens type. The mechanism should also allow for relatively straightforward change-out of lenses and provide reasonable, long-term reliability in an industrial setting.

SUMMARY OF THE INVENTION

This invention overcomes disadvantages of the prior art by providing an electro-mechanical auto-focus function for a smaller-diameter lens type (illustratively, an M12 lens) that nests, and is removably mounted, within the mounting space and thread arrangement of a larger-diameter lens base (illustratively, a C-mount lens), which is provided on a vision system camera assembly housing. This arrangement allows the camera assembly's overall form-factor/size to remain small but enables straightforward configuration of the camera assembly for either an auto-focusing M12 lens or a C-mount lens that can be manually focused.

In an illustrative embodiment, the camera assembly includes a threaded base having a first diameter, which illustratively defines a C-mount base. A motor-driven gear-reduction drive assembly is mounted internally (taken in a direction along the lens axis) of the camera assembly's front (lens-carrying) face in a position behind the threaded C-mount base with respect to the interior side of the camera assembly's front face. A main drive gear, that operates at a reduction, with respect to the motor, includes teeth that project radially inwardly relative to the inner diameter of the threaded C-mount base. The drive gear teeth engage corresponding teeth on the outer diameter of a cylindrical focus gear, which has an internal lead screw. The focus gear is freely rotatable, and removably captured, within the threaded C-mount base in a nested, coaxial relationship. The internal lead screw of the focus gear threadingly engages the external threads of a coaxial lens holder. The threaded relationship of the focus gear and lens holder allows the rotation of the drive gear to be converted to linear/axial motion by the lens holder with respect to the camera assembly housing. The lens holder includes flats, or other anti-rotation stops, that allow its axial movement but restrain any rotational motion. The lens is threadingly mounted within the lens holder at an appropriate position with respect to the plane of the sensor. By rotating the main drive gear, the linear/axial position of the lens with respect to the sensor is changed and optimal focus is achieved. This arrangement illustratively allows for exchanging the installed M12 lens with other, differing-focal-length M12 lenses, and/or for the removal of the focus gear and lens holder to allow for installation of a "C" mount lens of appropriate parameters.

The system allows for straightforward change-out between larger-diameter (e.g. C-mount) base lenses and smaller-diameter (e.g. M12) base lenses with associated auto-focus components without the need of alteration to the vision system camera housing or internal components. When fitted with an auto-focus arrangement, setup is straightforward and focus is reliably maintained.

BRIEF DESCRIPTION OF THE DRAWINGS

The invention description below refers to the accompanying drawings, of which.

DETAILED DESCRIPTION

Figure 1:
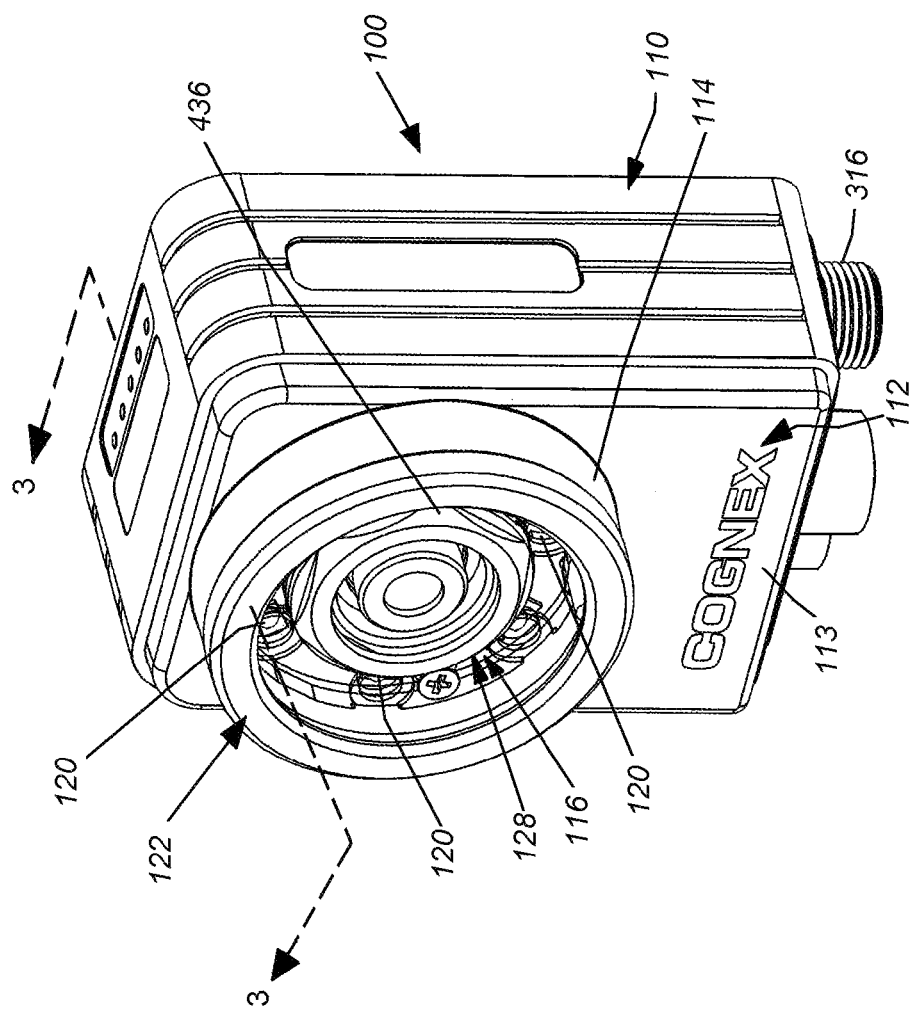
FIG. 1 is a perspective view of a vision system camera assembly with a removably attached auto-focus base and exemplary M12 lens according to an illustrative embodiment.

FIG. 1 illustrates a camera assembly 100 according to an illustrative embodiment. As described below, the illustrative camera assembly 100 includes and on-board vision system processor that is capable of performing vision system tasks on acquired image data. In alternate embodiments, it is expressly contemplated that some or all of the vision system tasks can be performed remote from the housing/enclosure of the camera assembly, with the processing components interconnected via a wired or wireless link. The camera assembly housing 110 includes a front housing face 112 that includes a raised, circular shoulder 114 that surrounds the central lens mount 116 and an optional ring illuminator (using illustrative LEDs 120). Like other portions of the assembly 100, the front housing face can be illustratively constructed from a durable, heat-dissipating material, such as cast aluminum alloy. Other materials (e.g. polymers and composites) can be use to construct housing components in alternate embodiments. With brief reference to FIG. 3, the front face 112 can optionally include a decorative polymer overlay façade 113, which removably covers the structural (aluminum) face component 115. When referencing the front face 112, it is meant to include the structural component 115 and optionally, the decorative front façade. The raised circular shoulder 114 removably engages a transparent cover assembly 122. The cover assembly 122 is also optional. It protects the illustrative lens assembly 128 from dust and contamination. It can be attached by a press-fit or a variety of other mechanisms (e.g. threads, clips, etc.).

Figure 2:
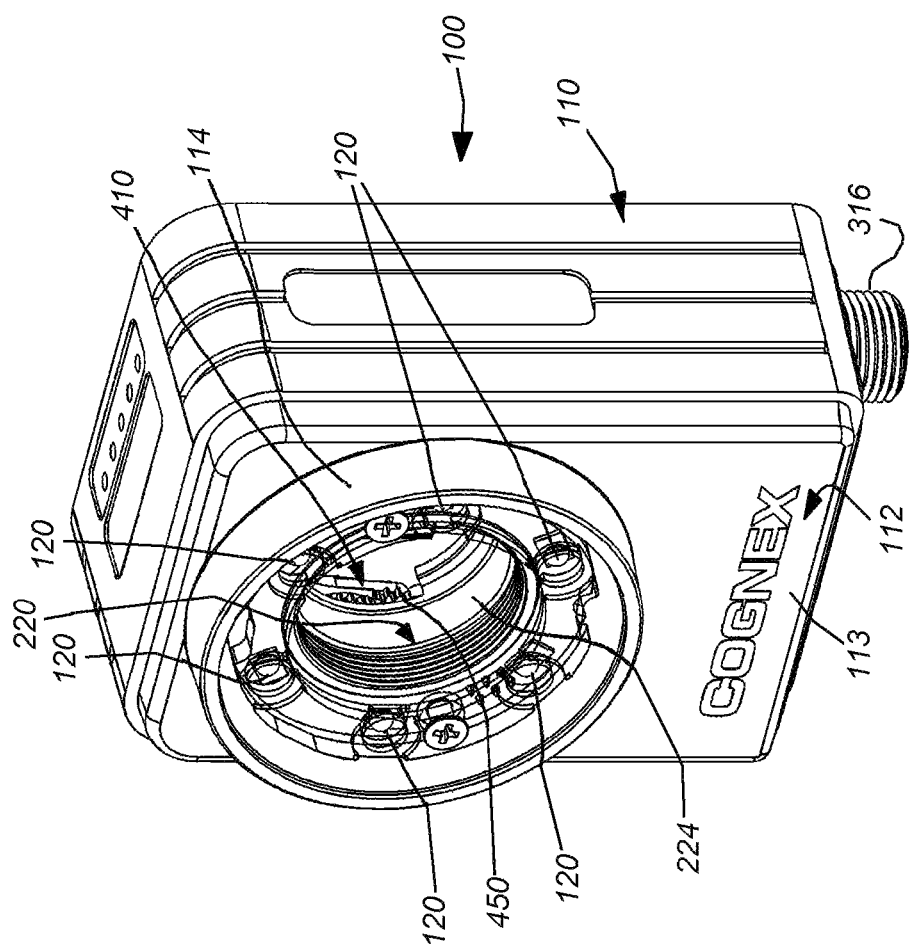
FIG. 2 is a perspective view of the illustrative camera assembly of FIG. 1 showing the auto-focus base and exemplary M-12 lens removed to reveal the illustrative C-mount threaded base on the camera housing, and internally mounted auto-focus drive gear assembly.
Figure 3:
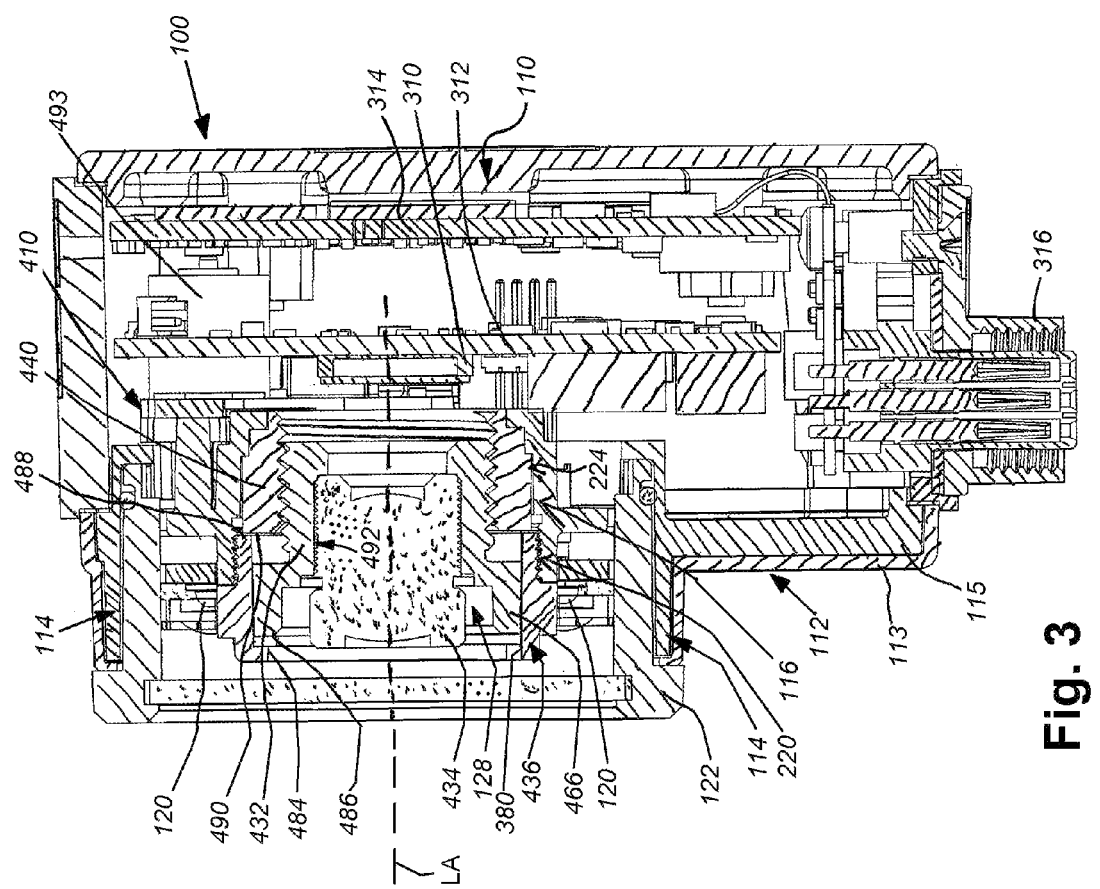
FIG. 3 is a side cross section of the illustrative vision system camera with auto-focus base and exemplary M12 lens attached, taken along line 3-3 of FIG. 1.

With further reference to FIGS. 2 and 3, the housing enclosure 110 contains the control and processing electronics for the vision system and associated illuminator. The sensor 310 resides on a front circuit board 312 in alignment with the optical axis system's lens axis (dashed line LA). Other processing and networking components are provided on a rear circuit board 314 and a bottom connector (or a plurality of such connectors) 316 allow the vision system to receive power and transfer control and image data to and from a remote device (such as a PC or networked device—not shown). The arrangement and function of the electronic components in the illustrative vision system are highly variable in alternate embodiments. Also, as used herein orientational and directional terms such as "front", "rear", "side", "top", "bottom", "forward", "backward", "up", "down", "vertical" and "horizontal" should be taken as relative conventions only, and not as absolute indications of orientation or direction with respect to a fixed reference system, such as the acting direction of gravity.

Notably, the front face 112 supports the camera mount 116 and maintains it in alignment with the axis LA. As shown in FIG. 2, when the lens assembly (128) is removed, it reveals the base threads 220 for mounting a larger-diameter lens type, such as the above-described C-mount lens type. These threads extend at least partially from the front of the mount 116, which can include a more-rearward unthreaded portion 224. The threaded portion 220 allows for conventional mounting of an illustrative C-mount lens (or other similar mount type) with appropriate focal distance from the sensor. This focal distance can be set using a lock ring or other stopper (not shown) that bears against the surface of the front face 112, or another structure relative to the mount 116. When an exemplary C-mount lens is attached to the mount 116, its focus (and optionally, its zoom) is adjusted manually using, for example, appropriate adjustment rings on the lens body.

Figure 4:
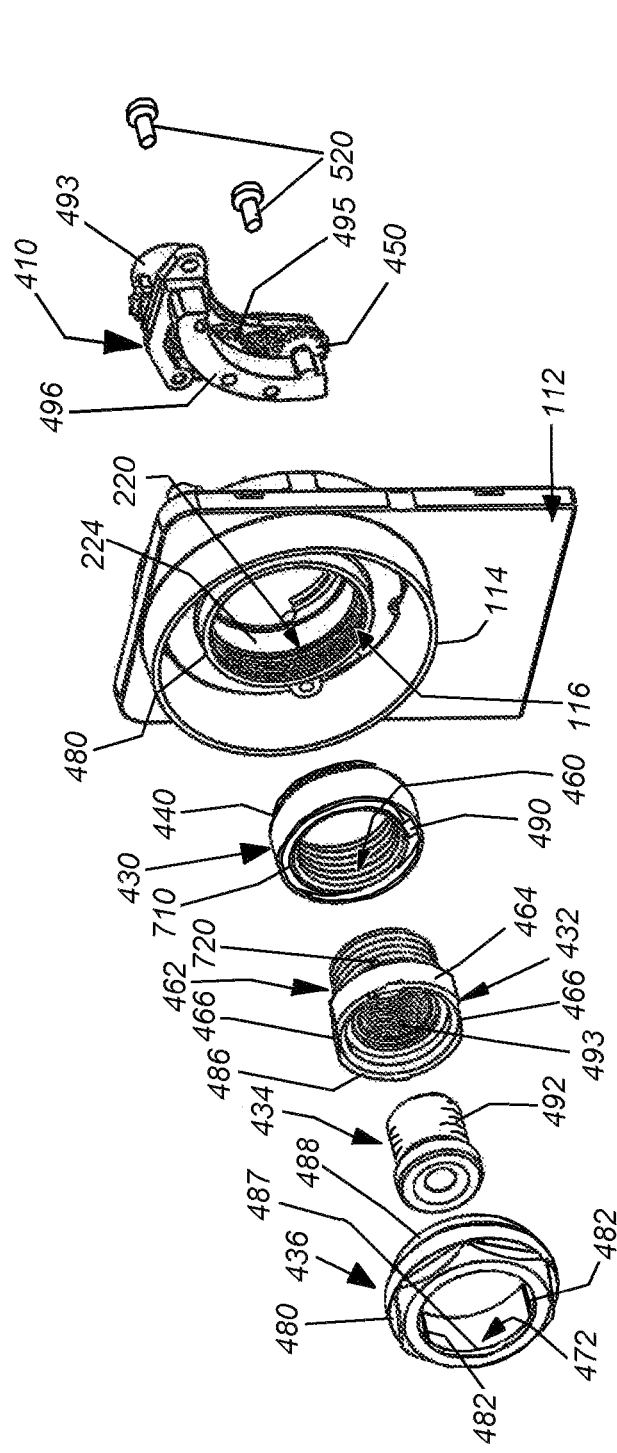
FIG. 4 is an exploded perspective view of the front face of the illustrative camera assembly of FIG. 1 showing the auto-focus base components and exemplary lens removed therefrom.

The diameter of the mount 116 is sufficient to allow for attachment of an auto-focus lens assembly using a smaller diameter lens (e.g. an M12 base lens) according to an illustrative embodiment. With further reference to the exploded view of FIG. 4, the auto-focus lens assembly (128 above) and focusing gear assembly 410 are each shown in as separated components. The lens assembly 128 consists of a plurality of nested, coaxial components that include a focus gear 430, a lens holder 432, exemplary lens 432 (which in this case is an M12 lens or other lens having a sufficiently smaller mounting base diameter than the C-mount 116), and a front stopper 436.

Figure 5:
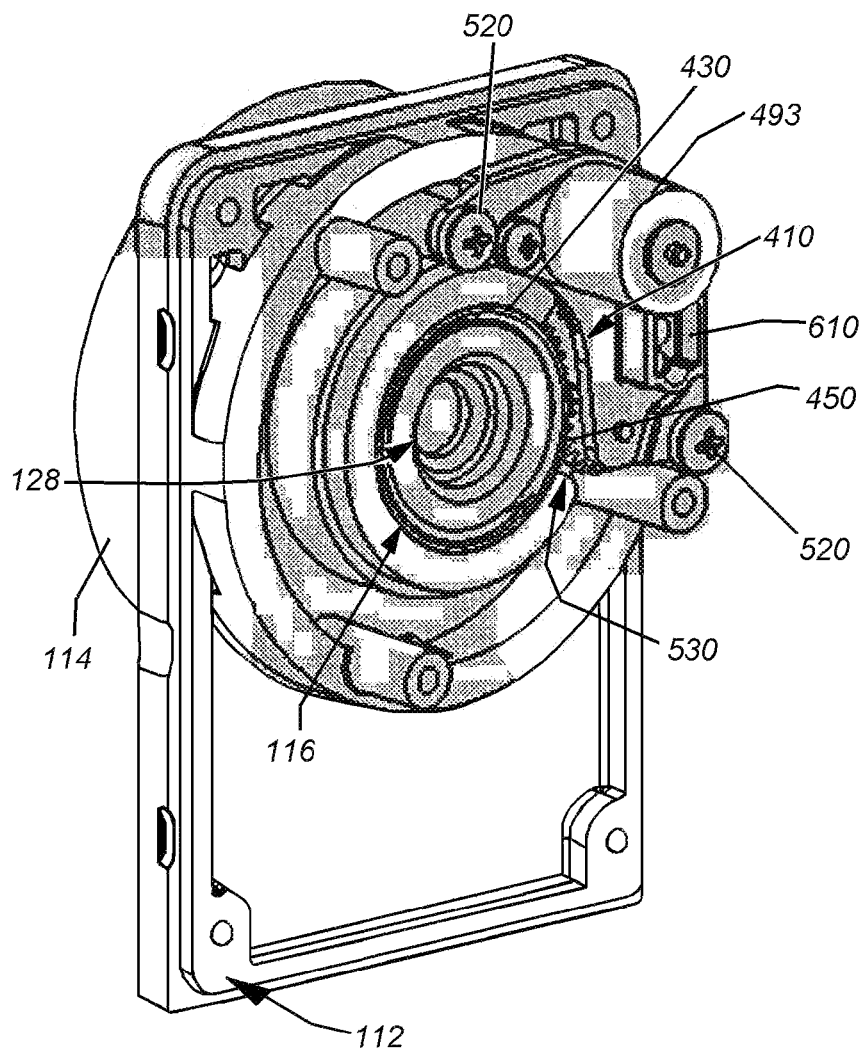
FIG. 5 is a rear perspective view showing the interior side of the front face of the illustrative camera assembly of FIG. 1 including the auto-focus drive gear assembly, auto-focus bases components and exemplary M12 lens.

Referring also to the cross section of FIG. 3 and the rear view of FIG. 5, the focus gear 430 (also termed a "focus member" of the overall, removable auto-focus assembly) includes a rear gear tooth surface 440 that is arranged to removably engage the teeth of the contacting drive gear 450 of the gear assembly 410. The forward portion 442 of the focus gear 430 is a straight cylindrical surface that slidably nests within the unthreaded portion 224 of the mount 116. The inside surface 460 of the focus gear is internally threaded to engage a corresponding external thread on the rear portion 462 of the lens holder 432. The front end 464 of the lens holder 462 defines a radially outward rim having a straight cylindrical exterior surface that is broken by a pair of diametrically opposed flats 466. The cylindrical exterior surface of the lens holder 432 nests within the inner surface 472 of a front stopper 436. The stopper 436 includes an external thread at its rear 476 that mates with the internal thread of the mount 116. The stopper seats against the mount's front rim 480. The stopper includes at least one inner projection 482 along its inner surface 472 that corresponds with one of the flats 466 on the lens holder 432. This engagement prevents the lens holder 432 from rotating with respect to the stopper 436, while allowing the lens holder to slide axially (linearly) when the stopper is fully secured within the mount 116. The flats and projection are one of a variety of keying mechanisms (for example, nested polygonal shapes) that can be employed to allow axial movement, but prevent rotation of the lens holder with respect to the stopper and underlying housing. In an embodiment, the lead screw thread provided between the lens holder and focus gear defines a standard M18×1.5 mm thread. However other thread sizes and/or types are expressly contemplated in alternate embodiments.

The rear rim 484 of the stopper projects radially inwardly sufficiently to align with the front rim 486 of the lens holder 432, and act as a stop against forward axial movement beyond a predetermined distance. Likewise, the rear rim 488 of the stopper 436 axially retains the focus gear 430 by engaging the front edge 490 of the focus gear 430.

The exemplary lens 434 is attached by mating external threads 492 on the lens base to corresponding internal threads 493 within the lens holder 432. The lens is typically threaded into the lens holder one or more shoulders rests on a corresponding lens holder rim as shown generally in FIG. 3. Appropriate stoppers or lock rings can be employed to vary the seating location of the lens. In this embodiment, the lens comprises an M12 base mount, but any lens type having a generally smaller-diameter base that also allows for the nested arrangement described herein can be employed in alternate embodiments.

In operation, the gear assembly 410, driven by a motor 493, drives the drive gear 450 at a predetermined rate. This causes the focus gear 430 to rotate while the lens holder remains rotationally fixed but moves axially as the internal threads of the focus gear 430 rotate with respect to the external threads of the lens holder 432. By rotating the gear assembly 410 in a given direction, the lens holder 432 and lens 434 move axially in either a forward or rearward direction within the overall, predetermined range of linear/axial motion.

The gear assembly 410 is mounted to the rear side of the front housing face 112 (see FIG. 5) using screws 520, or other fasteners. It conforms to the circular dimension of the mount 116, and defines a portion of arc of the mount 116. The rear side of the front face 112 includes a cutout 530 that allows the gear assembly to project into the region of the inner perimeter of the mount, and corresponding screw bases for receiving the screw fasteners 520. The gear assembly 410 defines a frame having a base plate 495 that aligns on end of each of the axles of each of the gears, and an overlying frame piece 496 that engages the opposing end of each of the axles. The base plate 495 also supports the motor 493.

The motor 493 can be any acceptable type of motor, including a stepper motor, servo motor and standard DC motor. The motor 493 receives control signals from the processor circuitry using appropriate controller hardware and software that can be implemented in accordance with ordinary skill. The controller bases motion of the motor on focus information in an illustrative embodiment. As such, the vision system processor reads the state of captured images at each focus position and determines which represents the best focus. The decision as to the best focus can be performed in a variety of ways that are clear to those of skill in the art. For example, the system can step through various focus positions and decide which one provides the crispest boundary between contrast edges.

Figure 6:
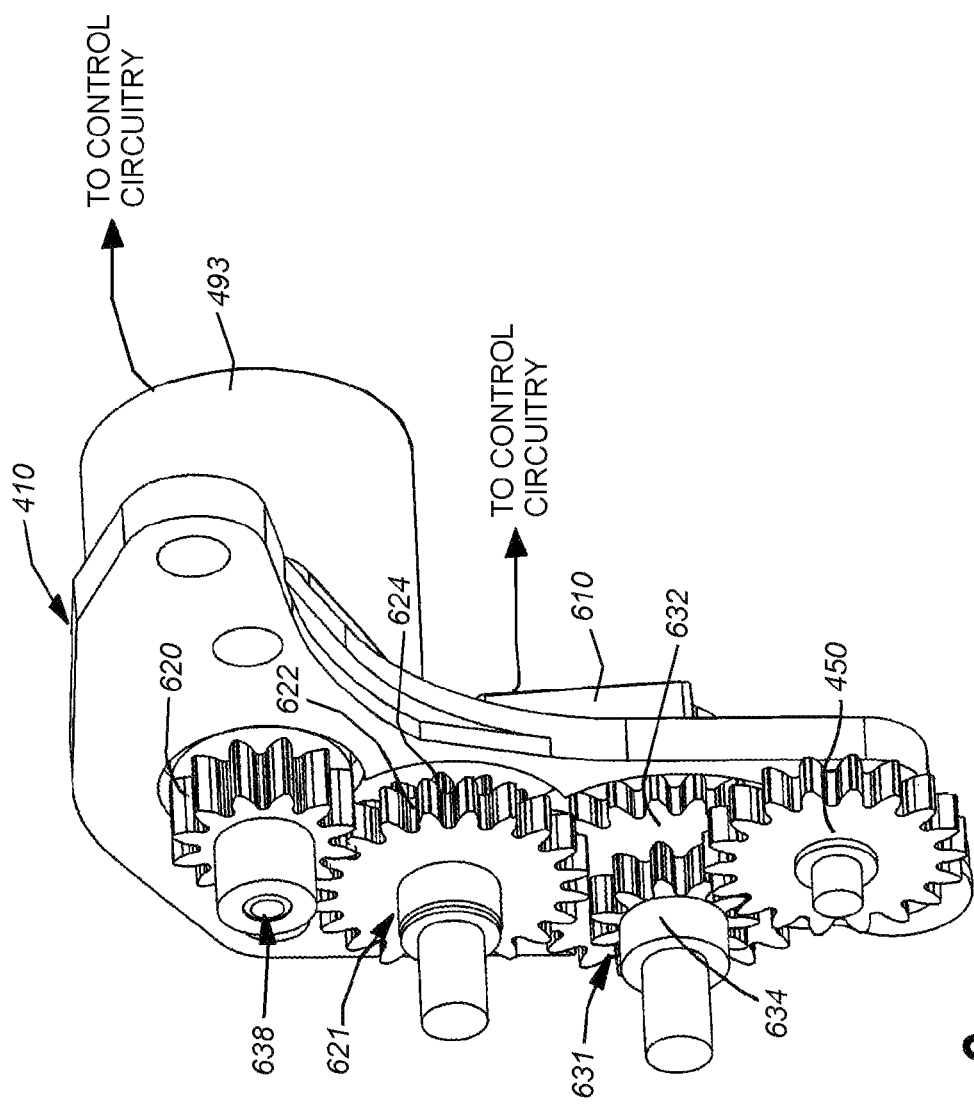
FIG. 6 is a perspective view of the reduction gear train of the auto-focus drive gear assembly for use in the camera assembly of FIG. 1, according to an illustrative embodiment.

In an embodiment, and with further reference to FIG. 6 (in which the overlying frame piece 496 is removed for clarity), the physical movement/position of the gear assembly 410 is monitored using a conventional encoder 610 that is mounted on the rear face of the gear assembly base 495 adjacent to the motor 493. The motor 493 includes a pinion drive gear 620. This pinion drive gear 620 engages and drives a first reduction gear 621 that includes two stacked gears 622 and 624 providing a first reduction. The smaller-diameter gear 624 drives a second reduction gear 631 via a larger diameter gear 632 stacked with a smaller-diameter gear 634 that drives the main drive gear (also termed an idler gear) 450. The main drive gear 450 projects into the perimeter of the mount (116).

In an illustrative embodiment, the pinion drive gear 620 is directly secured to the motor drive shaft 638 through the base plate 495. In an illustrative embodiment, the pinion drive gear 620 has 12 teeth. The two stacked gears 622 and 624 of the first reduction gear 621 have 20 and 13 teeth respectively. The two stacked gears 632 and 634 of the second reduction gear 631 have 23 and 11 teeth respectively, and the main drive (idler) gear 450 has 18 teeth. The focus gear 430 (440) in this embodiment has 54 teeth. This arrangement provides a gear reduction between the motor and focus gear of approximately 14.47:1. Note that this gear arrangement is illustrative of a variety of possible gear reduction and drive transmission arrangements that can be implemented for use with the auto-focus system described herein, and the particular gears described herein are by way of example.

In the illustrative embodiment, the motor 493 is a stepper (or similar) motor operating at 20 pulses per revolution and a speed range of approximately 500-2000 pulses per second. The encoder provides 48 lines per revolution, defining a motor-to-encoder reduction of approximately 2.964:1. This provides a motor steps-to-encoder ratio of approximately 1.235 pulses per line. This value is used to monitor and maintain the motion of the auto-focus system. The thread arrangement between the focus gear and lens holder provides a ratio of 1.5 mm of linear/axial travel for the lens holder with respect to the focus gear for each revolution of the focus gear. This is equivalent to approximately 0.00518 mm of linear/axial travel for each motor step, providing a very fine degree of control of lens focus. Again, these ratios are illustrative of a variety of possible arrangements.

In this embodiment, a total linear/axial travel distance of approximately 4.5 mm is sufficient to provide a desired range of focus for the exemplary M12 lens. This range can be greater or less than 4.5 mm in alternate embodiments, depending in part upon the optical characteristics of the lens type being employed in the lens holder. The range can be varied (for example) by changing the relative axial lengths of the stopper, lens holder and focus gear. Given the above-described, illustrative range of linear travel, the total number of encoder lines is approximately 703, and the total motor steps for full travel is approximately 868.5.

A user or the manufacturer (installer) installs a given lens type in the mount 116, which can be initially provided without a lens as shown in FIG. 12. In the case of a C-mount or equivalent full/large-diameter lens, the installer threads the lens base into the mount 116 until it seats to the proper focal distance with respect to the sensor. In the case of a smaller-diameter M12 or equivalent lens, the installer first inserts the focus gear 430 until its cylindrical rim 442 is fully seated against the unthreaded portion 224 of the mount 116, ensuring that its rear gear teeth 440 mesh with the teeth of the main drive gear 450. The installer then (typically) threads the desired M12 (or equivalent) lens 434 into the lens holder 432 until is securely seats within the threaded well. The installer then begins threading the lens holder 432 onto the focus gear 430 and places the stopper 436 over the lens holder so that at least one of the lens holder flats 466 is aligned with a radially inward projection 482 on the stopper 436. The user then rotates both the stopper 436 and the lens holder until the stopper is completely seated within the mount 116.

Once the auto-focus lens assembly is fully mounted, the installer can apply the cover assembly 122 to the raised rim 114 to shield the assembly against dust and contamination. After assembly, a user can mount and orient the vision system camera assembly 100 with respect to a runtime scene (for example a part inspection station on a production line).

Figure 7:
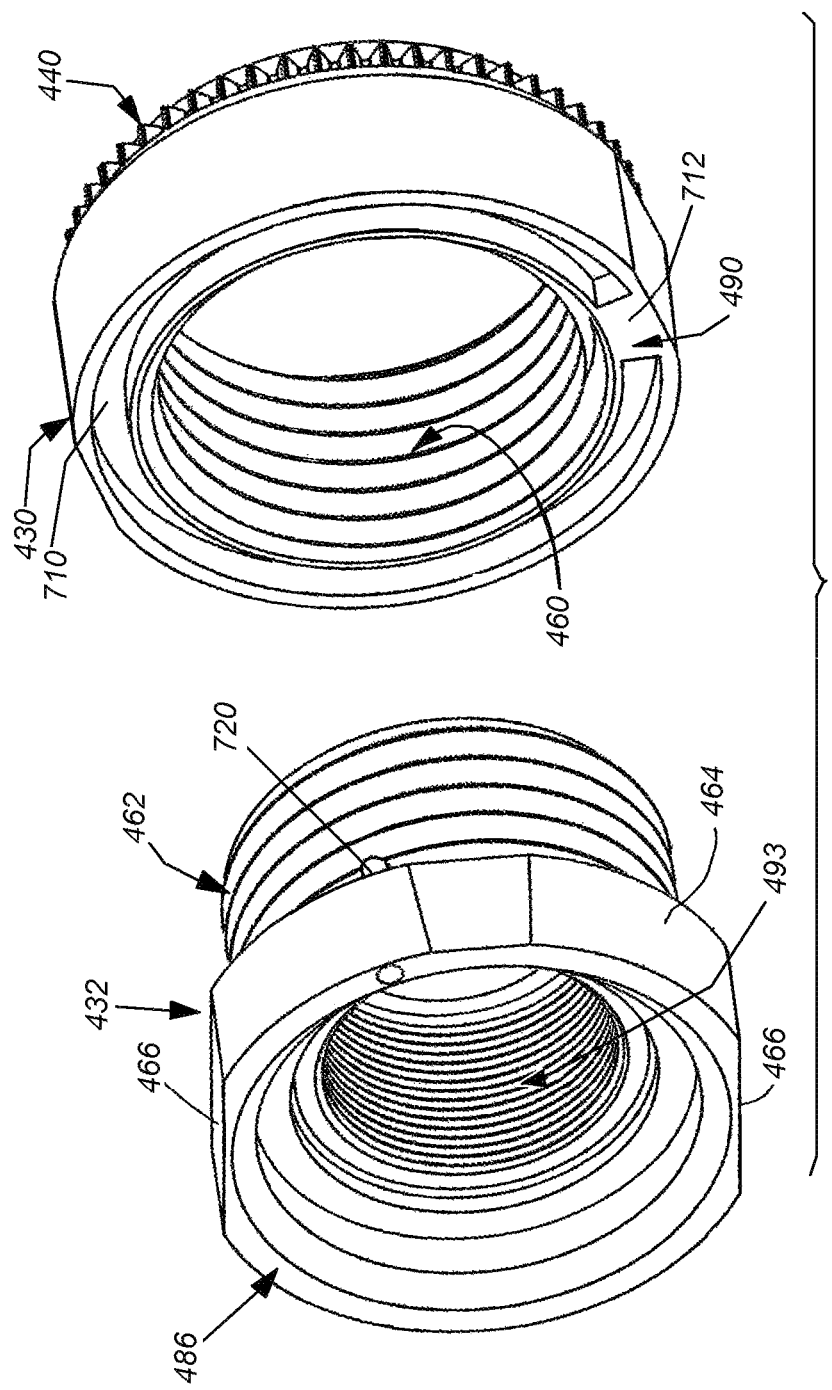
FIG. 7 is an exploded perspective view of the front face of the illustrative camera assembly of FIG. 1 showing the auto-focus base components and exemplary lens removed therefrom according to an alternate embodiment in which an arcuate slot and pin are respectively provided between the focus gear front edge and the lens holder rear edge to allow for attachment and detachment of the auto-focus lens assembly within the mount of the camera assembly.

With further reference to FIG. 7, the focus gear 430 is provided with an arcuate slot 710 that is broken by a stop 712 formed in the front rim 490 of the focus gear. This slot extends approximately 90-97 degree around the axis of the lens assembly. The arcuate slot 710 is sized and arranged to selectively receive a holder pin 720 that is mounted on the rim 464 of the lens holder 432, and projects rearwardly approximately 2-4 millimeters. The pin is sized to disengage from the slot as the lens holder advances linearly, so that it does not become bound up on the stop 712 in forward linear/axial motion as the focus gear rotates through a revolution.

Upon startup, the controller causes the motor 493 to drive the lens 434 and holder 432 inward until the holder pin 720 of the lens holder 432 comes into contact with the stop 712 in threaded focus gear 430. At this point, the encoder stops sending pulses as the lens holder can no longer advance inwardly, and thus the drive assembly ceases rotation, causing the encoder to cease sending pulses. The cessation of pulses indicates to the controller that the inward limit stop has been reached. The controller stops further inward motion by the motor at this time. The pulse counter also notes the current limit position, and this value is used by the controller as a baseline reference position for any further motion by the motor. Thus, when the focus position is eventually determined and set, the number of pulses from the inward-most position is used in any future operation of the camera assembly to reset the focus. Note, in alternate embodiments, other limit-sensing mechanisms can be employed. For example, limit switches can be used at one or both of the opposing lens holder travel limits. alternatively, the control circuit can include a voltage or current-sensing mechanism that detects when the motor has reached a limit.

In an embodiment, the stopper 436 can be provided in two parts that are nested together. This makes assembly of the overall auto-focus assembly more-convenient, as the timing of the C-mount thread differs from that of the focus-gear/lens thread. The first stopper part 480 (see FIG. 4) includes the keys or projections 482 that engage the lens holder flats (or other structures) 466, and prevent rotation of the lens holder about the axis. A second, nested, part of the stopper (see ring 380 in FIG. 3) defines a radially inwardly directed ring that engages internal threads 487 of the stopper part 480, and serves to limit outward linear/axial movement of the lens holder during operation. Optionally, the ring 380 can include a transparent or light-filtering central window. A variety of other stopper arrangements that selectively restrict rotation and maximum linear/axial movement of the lens holder can be provided in alternate embodiments.

As described above, the focus position can be established using a variety of techniques that are clear to those of skill. In general, the camera either automatically establishes focus as part of its startup routine, or is commended through a user interface (not shown) via the network communication link, processor and controller to undertake a focus task. In either exemplary procedure, the system determines and stores an optimal axial position for the lens, corresponding to a number of pulses from a baseline position. This value is used to reset the focus, either at start-up or when focus is potentially lost.

While the gear reduction and motor arrangement 410 is shown and described as an internal structure to the housing (and housing front face), it is expressly contemplated that some or all of the drive components can be mounted externally—for example in a pod adjacent to the raised rim. The focus gear and other components can be provided with a tooth arrangement that meshes with an externally located drive gear. Likewise, the gear train can include bevel and/or worm hears that allow for right angle drive in various embodiments. More generally, while a gear assembly is used to drive the auto-focus components in an illustrative embodiment, another for of drive assembly, such as a linear motor or voice-coil driver, can be use to move the lens components axially with respect to the housing in alternate embodiments.

It should be clear that the above-described vision system camera with exchangeable lens types and an auto-focus assembly for at least one lens type provides a high degree of versatility to the vision system. The arrangement is relatively compact, reliable, robust and easy to install/service. It allows for straightforward re-tasking of a vision system camera, either by the manufacturer or end user. In addition, the modular nature of the drive assembly allows for it to be readily omitted in camera models where this feature is not desired, without any need to alter other aspects of the camera housing.

The foregoing has been a detailed description of illustrative embodiments of the invention. Various modifications and additions can be made without departing from the spirit and scope of this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. For example, any method or process performed herein can be accomplished using electronic hardware, software including a non-transitory computer-readable medium of program instructions, or a combination of hardware and software. Also, while an encoder that counts pulses is used in an embodiment, the determination of motor position and/or lens axial position can be determined and monitored by any acceptable position determination assembly, included, but not limited to a servo system/analog feedback system, a variable resistor, and the like. Additionally, while an auto-focus arrangement is employed in conjunction with the lens assembly's motor controller to achieve a desired focus based upon internal vision system processes, in alternate embodiments, the electromechanical mechanism described herein can be operatively connected to a manual or semi-automatic focusing arrangement. Thus the term "auto-focus" should be taken broadly to include any process or mechanism that allows for automated (motorized) motion of the lens to change its focal distance. Moreover, the materials used for any of the components herein are highly variable. Thus, polymers, metals, composites, and the like can be employed as appropriate to construct the vision system and individual components thereof, in accordance with ordinary skill. In addition a variety of tools and associated structures, which should be clear to those of skill, can be used to assembly the auto-focus lens assembly within the mount. Accordingly, this description is meant to be taken only by way of example, and not to otherwise limit the scope of this invention.

What is claimed is:

1. A vision system camera assembly comprising:
a housing having a face with a mount constructed and arranged to receive a first lens base having a first diameter, the mount being generally coaxial with an optical axis;
an auto-focus assembly coaxially mounted within the mount, and being constructed and arranged to receive a second lens base having a second diameter, the second diameter being smaller than the first diameter and having a lens holder that is mounted so as to move selectively along the axis;
a drive assembly that engages a portion of the auto-focus assembly and causes the lens holder to move along the axis in response to movement of the drive assembly;
a front stopper that includes an external thread at its rear that mates with an internal thread of the mount and an exterior surface of the second lens base nests within an inner surface of the front stopper; and
wherein the drive assembly is located within the housing on an inside surface of the face of the housing, the drive assembly removably engaging the auto-focus assembly.

2. The vision system camera assembly as set forth in claim 1, wherein the auto focus assembly comprises a focus member that rotates with respect to the mount in response to movement of the drive assembly, the focus member converting rotational movement thereof into linear movement along the axis by the lens holder.

3. The vision system camera assembly as set forth in claim 2 wherein each of the lens holder and the focus member include threads that mesh with each other when the lens holder is coaxially nested with respect to the focus member.

4. The vision system camera assembly as set forth in claim 3 wherein the focus member includes gear teeth constructed an arranged to engage a main drive gear of the drive assembly.

5. The vision system camera assembly as set forth in claim 4 wherein the drive assembly comprises a drive motor operatively connected with a controller, a position determination assembly operatively connected to the controller, and a reduction gear assembly operatively connected between the motor and the main drive gear.

6. The vision system camera assembly as set forth in claim 3 wherein the front stopper configured to allow an axial movement of the lens holder to a predetermined maximum forward position while limiting rotation of the lens holder.

7. The vision system camera assembly as set forth in claim 6, wherein the front stopper includes a rear edge that axially retains the focus member while allowing rotation thereof in response to the drive assembly.

8. The vision system camera assembly as set forth in claim 7 the drive assembly comprises a drive motor operatively connected with a controller, a position determination assembly operatively connected to the controller, the controller being constructed and arranged to set a baseline reference position when the lens holder is moved to a maximum position, engaging the stopper.

9. The vision system camera assembly as set forth in claim 1 further comprising a ring illuminator located coaxially radially outwardly from the mount on the face of the camera housing.

10. The vision system camera assembly as set forth in claim 9 further comprising a rim radially outwardly of the ring illuminator, constructed and arranged to removably receive a cover with a transparent window.

11. The vision system camera assembly as set forth in claim 1 wherein the first lens base defines a C-mount base.

12. The vision system camera assembly as set forth in claim 11 wherein the second lens base defines an M12 base.

13. The vision system camera assembly as set forth in claim 1 wherein the second lens base defines an M12 base.

14. The vision system camera assembly as set forth in claim 1 wherein the housing encloses a vision system processor constructed and arranged to determine a focus state of a second lens and to move the drive assembly to a position that provides an optimal focus.

15. The vision system camera assembly as set forth in claim 14 wherein, at least one of, the first lens base comprises a C-mount base and the second lens base comprises an M12 base 16. A vision system camera assembly comprising:
a housing that encloses a vision system processor and a sensor, and having a face with a first threaded lens base having a first diameter and an optical axis in communication with the sensor;
an auto-focus assembly that includes a second threaded lens base smaller in diameter than the first threaded lens base, constructed and arranged to removably and coaxially nested within the within the first threaded lens base, the auto-focus assembly being linearly driven along the axis by a drive assembly, operatively connected to the vision system processor, based on a determined focus, the auto-focus assembly being removable to allow mounting of a lens with the first threaded lens base;
a front stopper that includes an external thread at its rear that mates with an internal thread of the mount and an exterior surface of the second threaded lens base nests within an inner surface of the front stopper; and
wherein the drive assembly is located within the housing on an inside surface of the face of the housing, the drive assembly removably engaging the auto-focus assembly.

* * * * *